March 19, 1940. F. W. BURGER 2,193,960
WHEEL
Filed Aug. 25, 1938
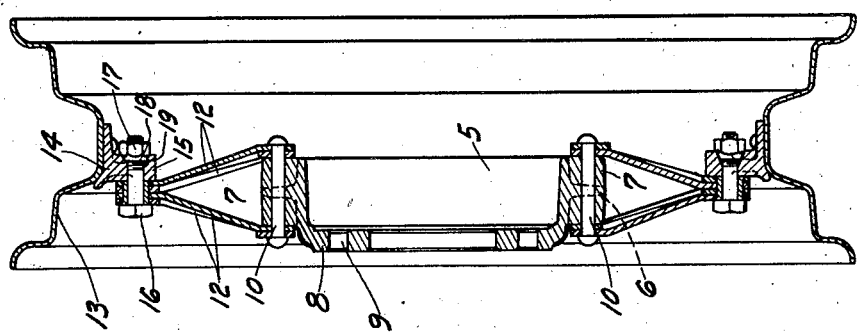
INVENTOR.
FREDERICK W. BURGER.
BY Walter E. Schirmer
ATTORNEY.

Patented Mar. 19, 1940

2,193,960

UNITED STATES PATENT OFFICE 2,193,960

WHEEL

Frederick W. Burger, Niles, Mich., assignor to Clark Equipment Company, Buchanan, Mich., a corporation of Michigan Application August 25, 1938, Serial No. 226,784

4 Claims. (Cl. 301—56)

This invention relates to wheels, and more particularly is directed to wheels of the suspension type useful in vehicles and agricultural equipment.

The present invention is concerned in detail with the provision of a tractor or implement wheel in which a more or less conventional type of rim may be employed for carrying a pneumatic tire, which rim is secured in a novel manner to the hub which supports the wheel assembly on the vehicle axle.

In the preferred form of the invention the hub is provided with a plurality of pivot centers to which are connected the ends of links which at their opposite ends are connected to lugs carried by the rim. The links form angular strut members between the rim and the hub, and provide a triangular truss or brace between each point of connection with the rim and to spaced points of connection about the periphery of the hub. Preferably, a double link construction is employed, that is to say, two links are provided in each of the sides of the triangular truss forming the brace for the rim. In this manner a suspension type wheel assembly is produced.

It has been known heretofore to provide a construction using a conventional rim which is clamped in some manner to clamp seats or the like carried on a wheel spider, the rim in such cases having no extraneous attaching means secured thereto.

Another type of wheel of this type which is in present use requires the provision of an integral rim and spider construction, thus limiting its application to special uses and not allowing for a standardizing of the construction.

The present invention contemplates striking a medium between the two prior forms of this type of wheel mentioned above so as to provide some standardization of the wheel assembly and yet eliminate the accurate machining and intricacies of attachment required in the demountably supported rim type of assembly.

Another feature of the present invention is the provision of an assembly which allows the rim to be mounted in either of two alternate positions on either side of the truss arms or links thus allowing a certain amount of variation in the tread of the vehicle using such wheels, which may be desirable for agricultural purposes.

Another object of the present invention is the elimination of any great amount of machining and the substitution therefor of stamped parts which may be readily assembled and connected to provide a strong, rugged construction amply adequate to meet the requirements of such a wheel.

Other objects and advantages of the present invention will appear more fully from the following detailed description which, taken in conjunction with the accompanying drawing, will disclose to those skilled in the art the particular construction and operation of a preferred form of the present invention.

In the drawing:

Figure 1 is an elevational view of a wheel embodying the present invention;

Figure 2 is a sectional view taken substantially on line 2—2 of Figure 1.

Considering now the illustrated embodiment of the invention, a wheel hub 5 is provided which has a radially extending peripheral rib 6 interrupted at circumferentially spaced points by transversely extending bosses 7. The hub 5 has a radially inwardly directed flange portion 8 at one side thereof which is provided with suitable openings 9 for clamping the hub to a supporting axle.

While the illustrated embodiment of the invention is directed to a wheel such as might be employed on an agricultural implement or tractor, it is to be pointed out that the features of the construction to be hereinafter described are equally well applicable to automotive or other vehicle wheels.

Extending through each of the bosses 7 is a clamping member 10 which may take the form of a bolt, rivet or the like, and which is adapted to provide a clamping support for securing the inner ends of a plurality of links 12 to the bosses. As disclosed in the present invention, each of the bosses is adapted to support at each face thereof two such links, which links extend in circumferentially diverging directions outwardly from the hub. Thus, each of the clamping members 10 provides a clamped support for four such links, two at each face of the boss.

As shown clearly in Figure 2, a rim 13 is provided which may be of any conventional type, such as employed for carrying pneumatic tires, and in the embodiment shown is of the drop center type. This rim is provided on its radial inner surface with a plurality of lugs 14 riveted or otherwise suitably secured thereto, which lugs have a radially inwardly extending portion 15 apertured to receive a clamping bolt 16. The bolt 16 is threaded at one end, and is provided with a nut 17 having a conical portion 18 adapted to seat in a spherical recess 19 formed in the inner face of the flange portions 15 of the lugs.

One link 12 from each side of each boss 7 is adapted to extend toward one of the lugs 14 while a second link 12 from the adjacent boss is also adapted to extend toward the first-mentioned lug. In other words, the rim is positioned relative to the hub so that the lugs 14 thereof lie radially intermediate adjacent bosses 7. Thus each lug 14 has clamped thereto four links 12, the links diverging both longitudinally and also laterally, as shown clearly in Figure 2, so as to find support on the two adjacent bosses 7 which lie radially on opposite sides of the lug 14. It will thus be seen that, in effect, a triangular support is provided with the lug 14 forming the apex of the triangle, and the spaced bosses on the hub forming the base thereof. As a result, a wheel of the suspension type is provided, that is, the hub 5 and axle of the vehicle are suspended from that lug which is uppermost in position and are thus carried by the rim of the wheel.

The links 12 are all identical in length and shape, with the links extending from opposite sides of the bosses 7 being reversed in position so as to angle inwardly toward the point of fixed attachment, by the bolts 16, to the lug 14. This, therefore, will greatly reduce the cost of the link constructions as they may all be made in a single stamping operation, and the clamping means such as shown at 10 and 16 requires no special skill or tools for assembling the links in position.

Another feature provided by the present invention is clearly illustrated in Figure 2 in that the lug 14 can be shifted in position so that the rim 13 may be placed in one of four different positions with respect to the center of the hub 5. In other words, the lugs 14 may be mounted on the opposite sides of the links 12 to shift the rim 13 laterally or axially of the hub so that the center line of the rim will fall substantially in the center line of the hub. Further, the rim 13 may be reversed in position so that the lugs 14 overhang the ends of the links 12, consequently bringing the center line of the rim within the axial limits of the hub. With this construction, four different positions of the lugs 14, with respect to their mounting on the ends of the links 12, are provided, thus facilitating variations in tread distance on agricultural implements and the like.

It is believed obvious that the present invention results in a very economical wheel construction capable of rapid assembly and requiring but few parts.

I am aware that various changes may be made in certain of the features herein illustrated and disclosed in the specific form of invention described, but I do not intend to be limited except as defined by the scope and spirit of the appended claims.

I claim:

1. In combination, a tire rim having a plurality of lugs secured to the radial inner surface thereof, four link members, means for clamping all four members at one end to one of said lugs, a hub having a corresponding plurality of transverse bosses and positioned within said rim so that said lugs lie circumferentially intermediate said bosses, and means for securing the opposite ends of two of said link members to one boss and securing the remaining two members to the adjacent boss.

2. In combination, a tire rim having a plurality of lugs secured to the radial inner surface thereof, four link members, means for clamping all four members at one end to one of said lugs, a hub having a corresponding plurality of transverse bosses and positioned within said rim so that said lugs lie circumferentially intermediate said bosses, and means for securing the opposite ends of two of said link members to one boss and securing the remaining two members to the adjacent boss, said link members being supported in axially spaced relation on said bosses.

3. In combination, a tire rim having circumferentially spaced lugs secured to the radial inner face thereof, a hub having an annular peripheral portion provided with corresponding circumferentially spaced axially extending bosses, said hub and rim being relatively positioned so that said lugs lie circumferentially intermediate said bosses, and rigid strut means detachably secured between each lug and the bosses between which it lies, said strut means comprising two pairs of link members, each pair diverging circumferentially from the other pair and axially from each other from each lug to positions at axially opposite ends of adjacent bosses.

4. In combination, a tire rim having circumferentially spaced lugs secured to the radial inner surface thereof, a hub having an annular peripheral portion provided with a corresponding number of circumferentially spaced bosses, said hub being positioned coaxially within said rim so that each rim lug lies circumferentially intermediate adjacent hub bosses, and diverging strut means between each rim lug and the said adjacent hub bosses whereby each hub boss supports the strut means of adjacent rim lugs between which it is circumferentially positioned.

FREDERICK W. BURGER.